(12) United States Patent
Song

(10) Patent No.: US 9,485,606 B1
(45) Date of Patent: *Nov. 1, 2016

(54) SYSTEMS AND METHODS FOR DETECTING NEAR FIELD COMMUNICATION RISKS

(71) Applicant: Symantec Corporation, Mountain View, CA (US)

(72) Inventor: Qu Bo Song, Chengdu Sichuan (CN)

(73) Assignee: Symantec Corporation, Mountain View, CA (US)

( * ) Notice: Subject to any disclaimer, the term of this patent is extended or adjusted under 35 U.S.C. 154(b) by 379 days.

This patent is subject to a terminal disclaimer.

(21) Appl. No.: 13/749,668

(22) Filed: Jan. 24, 2013

(51) Int. Cl.
*H04B 5/00* (2006.01)
*H04W 4/00* (2009.01)

(52) U.S. Cl.
CPC .................................... *H04W 4/008* (2013.01)

(58) Field of Classification Search
CPC . H04B 5/0025; H04B 5/0037; H04W 4/008; H04W 84/10; H04W 92/18
USPC ......................................................... 455/41.1
See application file for complete search history.

(56) References Cited

U.S. PATENT DOCUMENTS

| 7,640,361 | B1 | 12/2009 | Green et al. | |
| 8,014,720 | B2 * | 9/2011 | Lortz | G06F 8/61 |
| | | | | 455/41.1 |
| 2009/0055642 | A1 | 2/2009 | Myers et al. | |
| 2012/0315846 | A1 | 12/2012 | Gartner et al. | |
| 2013/0095751 | A1 * | 4/2013 | Kasslin et al. | H04W 12/12 |
| | | | | 455/41.1 |

OTHER PUBLICATIONS

Clifton Barker; Systems and Methods for Detecting Potentially Malicious Content within Near Field Communication Messages; U.S. Appl. No. 13/517,529, filed Jun. 13, 2012.

* cited by examiner

*Primary Examiner* — Ajibola Akinyemi
(74) *Attorney, Agent, or Firm* — ALG Intellectual Property, LLC

(57) ABSTRACT

A computer-implemented method for detecting near field communication risks may include (1) identifying a mobile device capable of near field communication, (2) identifying an attempted near field communication involving the mobile device, (3) tracking at least one contextual behavior relating to the attempted near field communication; and (4) determining, based at least in part on the contextual behavior, that the attempted near field communication poses a risk to the mobile device. Various other methods, systems, and computer-readable media are also disclosed.

20 Claims, 6 Drawing Sheets

SYSTEMS AND METHODS FOR DETECTING NEAR FIELD COMMUNICATION RISKS

BACKGROUND

Due to recent technological advances, individuals and organizations may quickly and easily carry and organize information and conduct day-to-day business using mobile devices (such as smart phones). The adoption of Near Field Communication ("NFC") technology for mobile devices has expanded the possibilities for quick, simplified, and unobtrusive information sharing, authentication, and various other transactions. For example, NFC devices may enable individuals to use mobile devices for financial transactions, gaining access to secured physical areas and/or digital resources, sharing files and/or contact information, etc.

Unfortunately, the ease of use and unobtrusiveness of NFC transactions may expose mobile device owners to a new class of attacks on their devices, their data, and/or their transactions. Individuals may inadvertently or unknowingly provide access to sensitive data to unknown and/or untrusted NFC devices in the course of attempting legitimate transactions and/or simply by carrying their mobile devices in proximity to malicious NFC devices.

Traditional technologies for managing NFC risks may include the use of secure connections during NFC transactions and/or scanning files transferred in NFC transactions. Unfortunately, these traditional technologies may fail to address many potential exploits available through NFC technology.

Accordingly, the instant disclosure identifies and addresses a need for additional and improved systems and methods for detecting near field communication risks.

SUMMARY

As will be described in greater detail below, the instant disclosure generally relates to systems and methods for detecting near field communication risks by tracking behaviors contextual to attempted NFC communications (e.g., behaviors of the attempted NFC communications, other attempted NFC communications, and/or mobile devices receiving the attempted NFC communications) and analyzing these behaviors for evidence of risks and/or attempted exploits.

In one example, a computer-implemented method for detecting near field communication risks may include (1) identifying a mobile device capable of near field communication, (2) identifying an attempted near field communication involving the mobile device, (3) tracking at least one contextual behavior relating to the attempted near field communication; and (4) determining, based at least in part on the contextual behavior, that the attempted near field communication poses a risk to the mobile device.

In some examples, the computer-implemented method may include performing a security action in response to determining that the attempted near field communication poses a risk to the mobile device.

In some examples, tracking the contextual behavior may include determining that the mobile device did not provide a user-facing notification of the attempted near field communication.

In some examples, tracking the contextual behavior may include determining that the attempted near field communication was performed by a first near-field-communication device in proximity to mobile device while a second near-field-communication device may be also in proximity to the mobile device.

In some examples, tracking the contextual behavior further may include determining that the attempted near field communication may include an attempted sensitive transaction and that the second near-field-communication device has performed an additional attempted near field communication including an additional attempted sensitive transaction.

In some examples, tracking the contextual behavior may include determining that the attempted near field communication may include an attempted complex transaction including a plurality of single-subject transactions that are marked as corresponding to plurality of distinct transaction types in a behavioral database.

In some examples, tracking the contextual behavior may include determining that the attempted near field communication may include an attempted file transaction including a transfer of at least one file not selected for the attempted file transaction via a user interface.

In some examples, tracking the contextual behavior may include determining that the attempted near field communication occurred within a predetermined temporal proximity to a plurality of additional attempted near field communications.

In some examples, tracking the contextual behavior may include determining that a configuration setting of the mobile device changed within a predetermined time period following the attempted near field communication.

In some examples, tracking the contextual behavior may include determining that the mobile device transmitted a message within a predetermined time period following the attempted near field communication.

In one embodiment, a system for implementing the above-described method may include (1) an identification module programmed to (i) identify a mobile device capable of near field communication and (ii) identify an attempted near field communication involving the mobile device, (2) a tracking module programmed to track at least one contextual behavior relating to the attempted near field communication, (3) a determination module programmed to determine, based at least in part on the contextual behavior, that the attempted near field communication poses a risk to the mobile device and (4) at least one processor configured to execute the identification module, the tracking module and the determination module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a mobile device capable of near field communication, (2) identify an attempted near field communication involving the mobile device, (3) track at least one contextual behavior relating to the attempted near field communication; and (4) determine, based at least in part on the contextual behavior, that the attempted near field communication poses a risk to the mobile device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
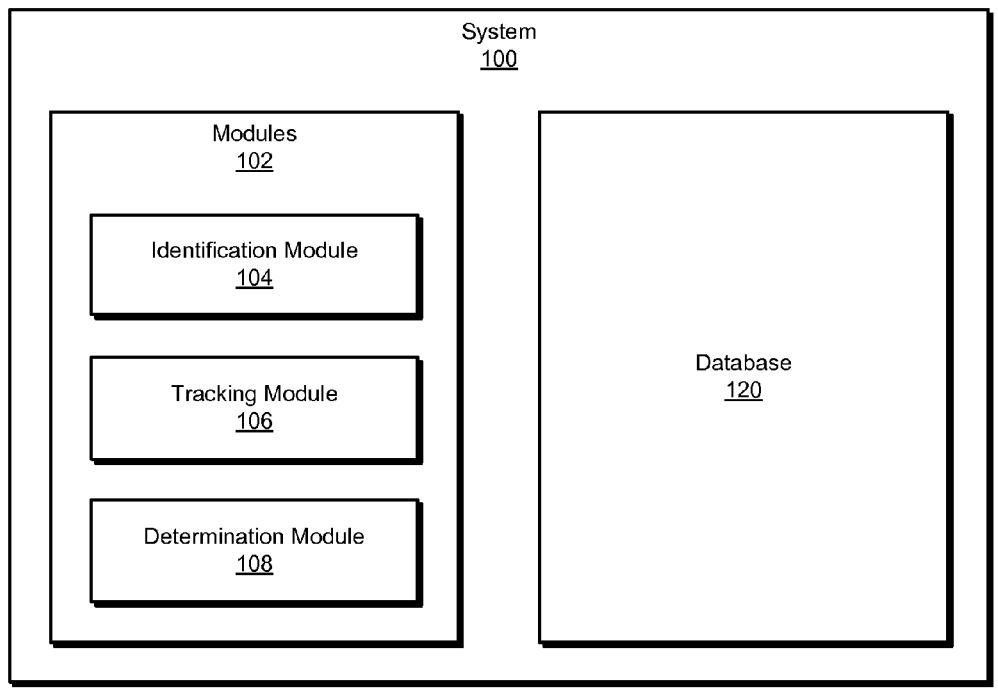
FIG. 1 is a block diagram of an exemplary system for detecting near field communication risks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting near field communication risks. As will be explained in greater detail below, by tracking behaviors contextual to attempted NFC communications (e.g., behaviors of the attempted NFC communications, other attempted NFC communications, and/or mobile devices receiving the attempted NFC communications) and analyzing these behaviors for evidence of risks and/or attempted exploits, the systems and methods described herein may protect owners of mobile devices from exploits and/or data loss more efficiently, potentially including exploits that may otherwise overcome secured connections and/or payload analysis (e.g., exploits that pose as legitimate transactions).

Figure 2:
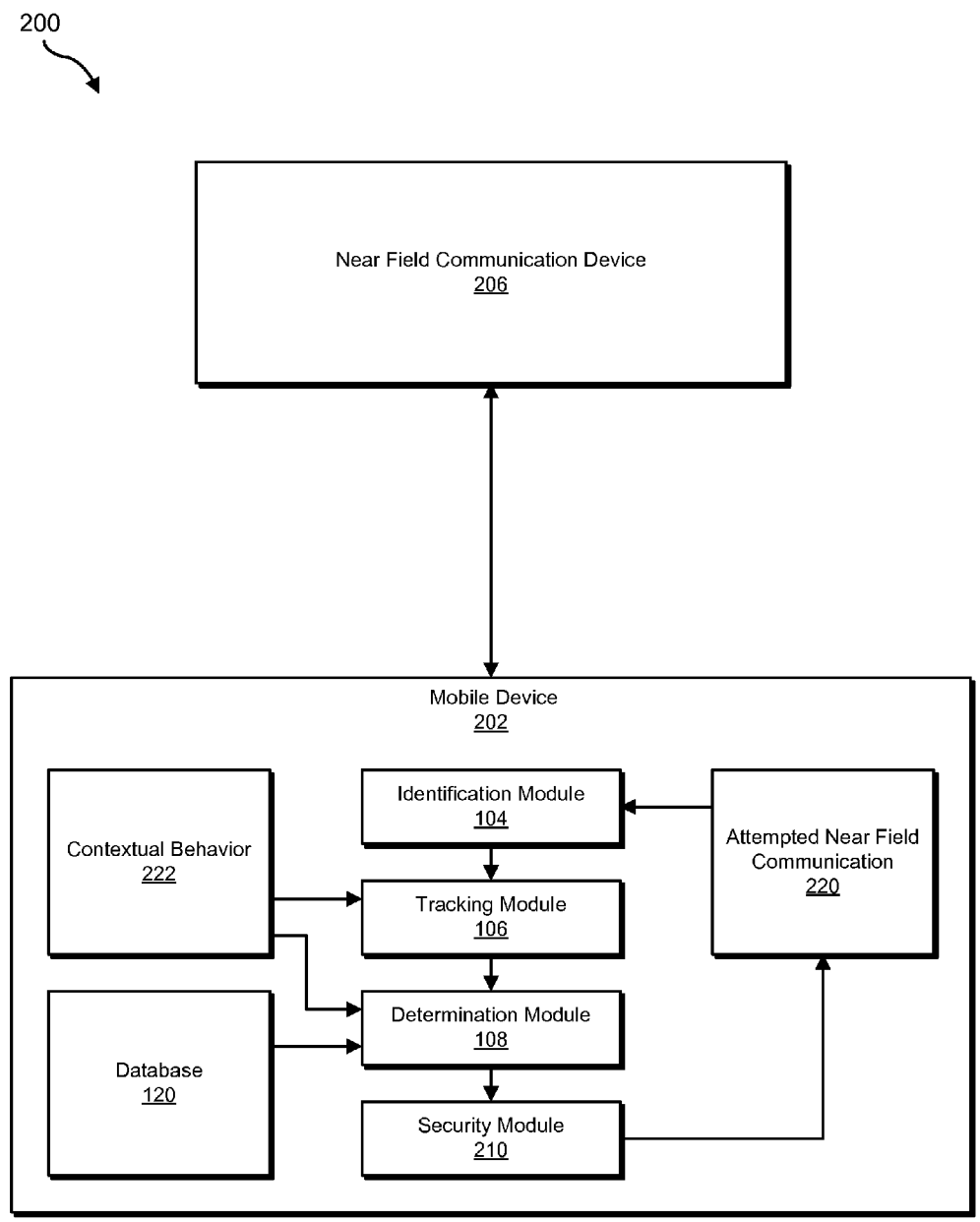
FIG. 2 is a block diagram of an exemplary system for detecting near field communication risks.
Figure 3:
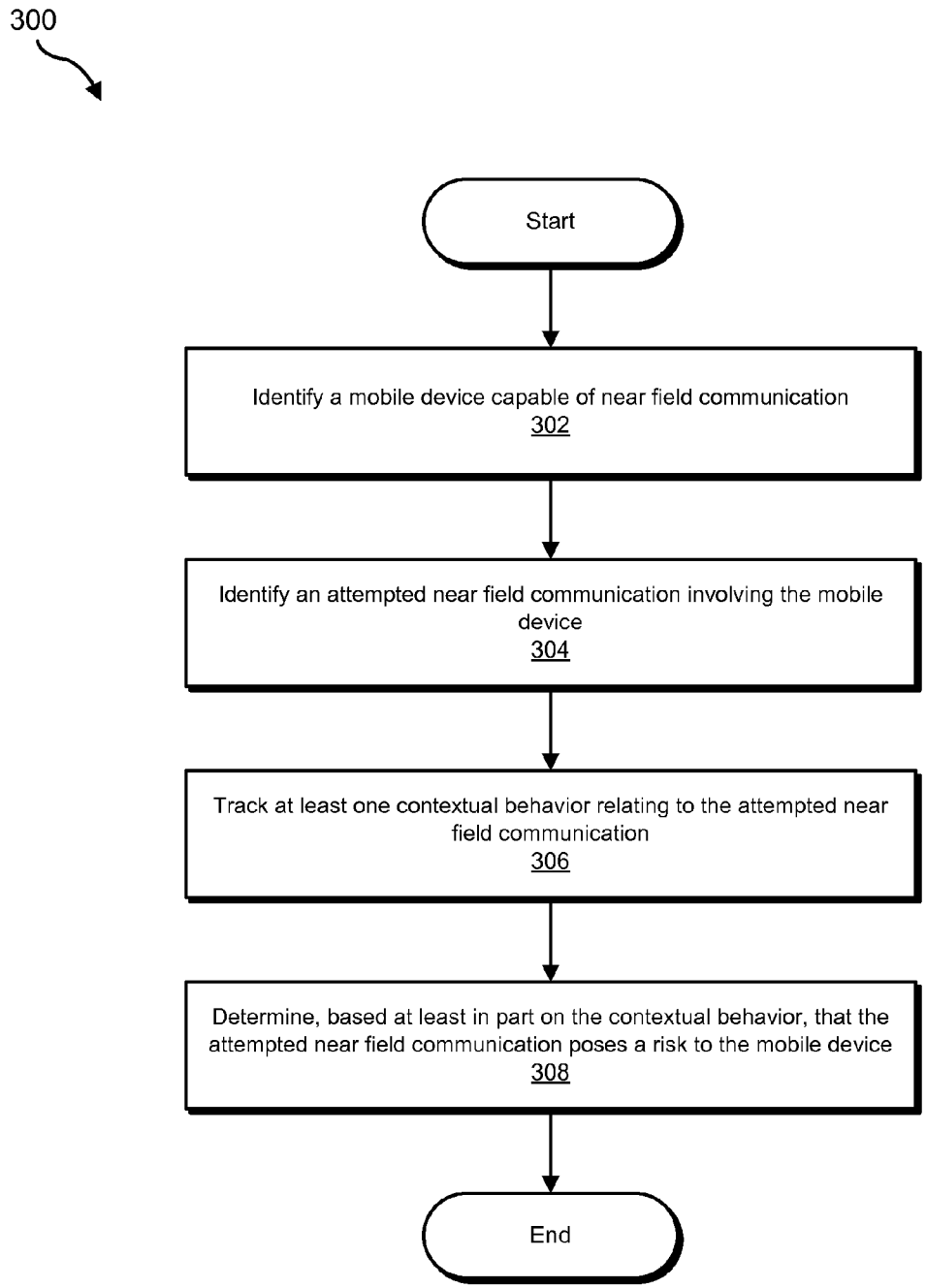
FIG. 3 is a flow diagram of an exemplary method for detecting near field communication risks.
Figure 4:
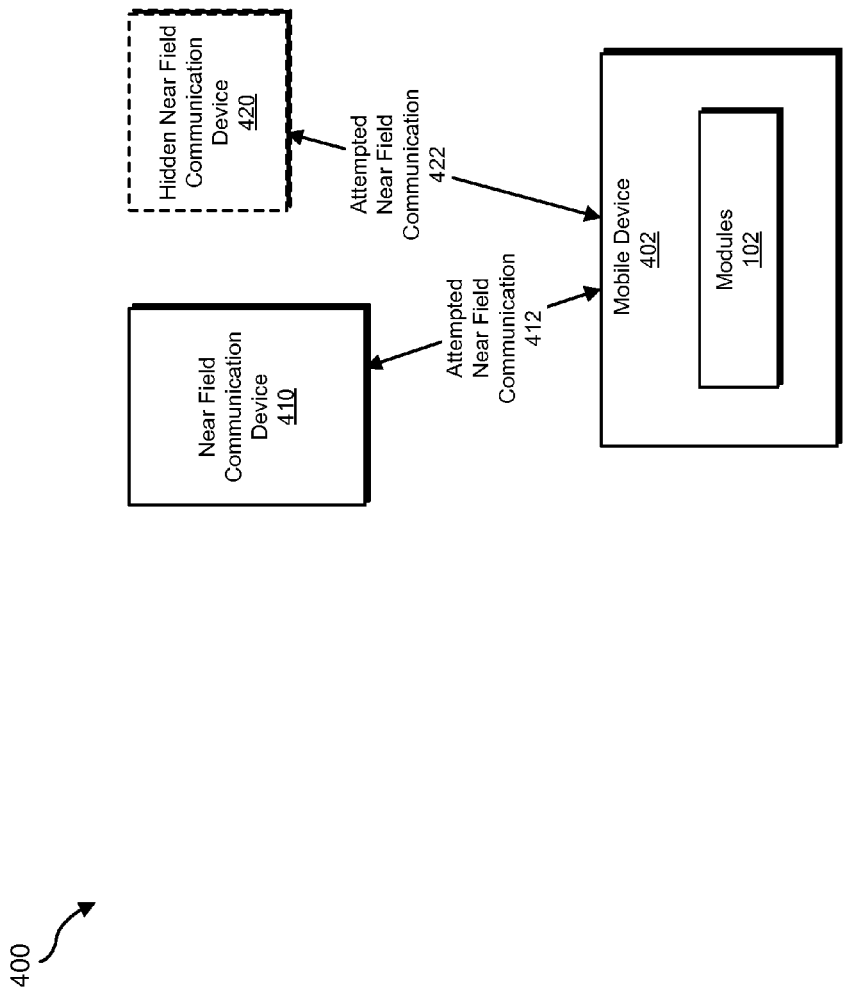
FIG. 4 is a block diagram of an exemplary system for detecting near field communication risks.

The following will provide, with reference to FIGS. 1, 2, and 4, detailed descriptions of exemplary systems for detecting near field communication risks. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for detecting near field communication risks. As illustrated in this figure, exemplary system 100 may include one or more modules 102 for performing one or more tasks. For example, and as will be explained in greater detail below, exemplary system 100 may also include an identification module 104 programmed to identify a mobile device capable of near field communication. Identification module 104 may further be programmed to identify an attempted near field communication involving the mobile device. Exemplary system 100 may additionally include a tracking module 106 programmed to track at least one contextual behavior relating to the attempted near field communication. Exemplary system 100 may also include a determination module 108 programmed to determine, based at least in part on the contextual behavior, that the attempted near field communication poses a risk to the mobile device.

Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., mobile device 202 and/or near field communication device 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store behavioral rules and/or patterns that indicate the legitimacy and/or illegitimacy of attempted near field communication transactions.

Database 120 may represent portions of a single database or computing device or a plurality of databases or computing devices. For example, database 120 may represent a portion of mobile device 202 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as mobile device 202 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a mobile device 202 in communication with a near field communication device 206. Mobile device 202 may be programmed with one or more of modules 102 and/or may store all or a portion of the data in database 120. Additionally or alternatively, near field communication device 206 may be programmed with one or more of modules 102 and/or may store all or a portion of the data in database 120.

In one embodiment, one or more of modules 102 from FIG. 1 may, when executed by at least one processor of mobile device 202 and/or near field communication device 206, facilitate mobile device 202 and/or near field communication device 206 in detecting near field communication risks. For example, and as will be described in greater detail below, one or more of modules 102 may cause mobile device 202 to detect near field communication risks (e.g., posed to mobile device 202 by near field communication device 206). For example, and as will be described in greater detail below, identification module 104 may be programmed to identify a mobile device 202 capable of near field communication. Identification module 104 may be programmed to identify an attempted near field communication 220 involving mobile device 202. Tracking module 106 may be programmed to track at least one contextual behavior 222 relating to attempted near field communication 220. Determination module 108 may be programmed to determine, based at least in part on contextual behavior 222, that attempted near field communication 220 poses a risk to mobile device 202.

Mobile device 202 generally represents any type or form of computing device capable of reading computer-executable instructions. Examples of mobile device 202 include, without limitation, cellular phones, tablets, Personal Digital Assistants (PDAs), multimedia players, embedded systems, combinations of one or more of the same, exemplary computing system 510 in FIG. 5, or any other suitable computing device.

Near field communication device 206 generally represents any type or form of computing device that is capable of near field communication. Examples of near field communication device 206 include, without limitation, cellular phones, tablets, Personal Digital Assistants (PDAs), multimedia players, embedded systems, laptops, desktops, point-of-sale devices, and the like. In some examples, Near field communication device 206 may represent a passive device (e.g., an unpowered chip and/or tag capable of being read by a powered NFC-capable device such as mobile device 202).

FIG. 3 is a flow diagram of an exemplary computer-implemented method 300 for detecting near field communication risks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a mobile device capable of near field communication. For example, at step 302 identification module 104 may, as part of computing device in FIG. 2, identify a mobile device 202 capable of near field communication.

As used herein, the phrase "near field communication" may refer to any method of and/or standard for wireless communication designed for, activated by, and/or requiring close proximity (e.g., 20 cm or under, 10 cm or under, 4 cm or under, 1 cm or under, etc.). In some examples, the phrase "near field communication" may refer to a method of wireless communication that does not first require pairing two devices for the two devices to communicate (e.g., separately configuring one or both of the devices to accept communication with the other device). In some examples, the phrase "near field communication" may refer to one or more standards for wireless communication defined by the NEAR FIELD COMMUNICATION FORUM. In various examples, near field communication applications may include contactless payment, data sharing, authentication (e.g., for access to secured physical locations and/or digital resources), automatically launching applications, executing tasks, and/or modifying configurations on mobile devices, and/or pairing devices for other communication methods (e.g., Bluetooth, Wi-Fi, etc.).

Identification module 104 may identify the mobile device in any suitable manner. For example, identification module 104 may identify the mobile device by executing on the mobile device. Additionally or alternatively, identification module 104 may identify the mobile device by receiving a message from the mobile device (e.g., about an attempted near field communication with the mobile device).

At step 304 one or more of the systems described herein may identify an attempted near field communication involving the mobile device. For example, at step 304 identification module 104 may, as part of computing device in FIG. 2, identify an attempted near field communication 220 involving mobile device 202.

Identification module 104 may identify any of a variety of attempted near field communications involving the mobile device. For example, identification module 104 may identify an attempt to push data to the mobile device (e.g., a uniform resource locator, an instruction, a configuration setting). Additionally or alternatively, identification module 104 may identify an attempt to read data from the mobile device (e.g., a payment card number, a file, a contact list, a user name, authentication information, etc.). In some examples, identification module 104 may intercept the attempted near field communication (e.g., preventing the attempted near field communication from proceeding until the context of the attempted near field communication has been analyzed). Alternatively, identification module 104 may simply observe the attempted near field communication. In some examples, identification module 104 may receive a message identifying the attempted near field communication from another application, service, and/or module that has intercepted and/or observed the near field communication.

At step 306 one or more of the systems described herein may track at least one contextual behavior relating to the attempted near field communication. For example, at step 306 tracking module 106 may, as part of computing device in FIG. 2, track at least one contextual behavior 222 relating to attempted near field communication 220.

As used herein, the phrase "contextual behavior" may refer to any behavior and/or pattern of behavior of the mobile device and/or one or more near field communication devices attempting to communicate with the mobile device. In some examples, the phrase "contextual behavior" may refer to a behavior observed during the attempted near field communication. Additionally or alternatively, the phrase "contextual behavior" may refer to a behavior observed within a predefined time window surrounding the attempted near field communication. In some examples, the phrase "contextual behavior" may refer to a behavior observed to be in response to the attempted near field communication (and/or in response to a chain of events precipitated by the attempted near field communication).

Tracking module 106 may track the contextual behavior in any suitable manner. For example, tracking module 106 may operate as a part of an application and/or service executing on the mobile device that is capable of monitoring one or more software and/or hardware interfaces of the mobile device and/or that accesses one or more application programming interfaces ("APIs") of the mobile device to observe behaviors on the mobile device. In some examples, tracking module 106 may intercept and/or record one or more behaviors observed on the mobile device during an attempted near field communication.

In some examples, tracking module 106 may track the contextual behavior by determining that the mobile device did not provide a user-facing notification of the attempted near field communication. As used herein, the phrase "user-facing notification" may refer to any notification capable of alerting a user of the attempted near field communication, prompting a user for permission to allow the attempted near field communication, and/or alerting a user of an effect (and/or potential effect) of the attempted near field communication. For example, the user-facing notification may include a display element in a graphical user interface of the mobile device, an alert sound produced by the mobile device, a haptic signal produced by the mobile device (e.g., a vibration), etc. For example, an application installed on the mobile device (e.g., a legitimate application or a malicious application) may be configured to establish a near field communication connection without notifying a user. In some examples, tracking module 106 may be configured to determine whether an application that is attempting to establish a near field communication connection displayed a visible notification and interrupted the near field communication connection until receiving user input.

In some examples, tracking module 106 may track the contextual behavior by determining that the attempted near field communication was performed by a first near-field-communication device in proximity to mobile device while a second near-field-communication device may be also in proximity to the mobile device. For example, since the range of near-field communication may be relatively small, the probability of the mobile device being within range of more than one near-field communication device may be relatively small. However, attackers may purposefully place an illegitimate near field communication device near a legitimate near field communication device in hopes that a user will authorized a communication with the illegitimate near field communication device thinking that the authorization was directed to the legitimate near field communication device. Accordingly, tracking module 106 may monitor for cases of multiple near-field-communication devices being within range of the mobile device (e.g., especially in the case of an attempted near field communication).

FIG. 4 illustrates an exemplary system 400 for detecting near field communication risks. As shown in FIG. 4, exemplary system 400 may include a mobile device 402 configured with modules 102 and in near field communication range with a near field communication device 410 and a hidden near field communication device 420. Using FIG. 4 as an example, an attacker may have hidden the hidden near field communication device 420 near the near field communication device 410 such that a mobile device (such as mobile device 402) that is within the near field communication range of near field communication device 410 is likely to be within the near field communication range of hidden near field communication device 420. Accordingly, tracking module 106 may, as a part of mobile device 402, track the behavior of mobile 402 at the time of an attempted near field communication 422 by hidden near field communication device 420 and observe that mobile device 402 is also within range of near field communication device 410.

In some examples, tracking module 106 may also determine that the attempted near field communication includes an attempted sensitive transaction and that the second near-field-communication device has performed an additional attempted near field communication including an additional attempted sensitive transaction. For example, by observing two near field communication devices simultaneously attempting to perform sensitive transactions with the mobile device, tracking module 106 may have observed evidence that at least one of the attempted sensitive transactions has originated from a malicious device. In some examples, tracking module 106 may also determine that the attempted sensitive transaction and the additional attempted sensitive transaction are of the same nature (e.g., requesting the same type of data). For example, tracking module 106 may determine that both attempted transactions include attempts to read payment card information from the mobile device. Using FIG. 4 as an example, near field communication 410 may represent a legitimate point-of-sale device conducting an attempted near field communication 412 with mobile device 402 to retrieve payment card information from mobile device 402 to conduct a legitimate transaction. Hidden near field communication device 420 may represent a device concealed near the near field communication device 410 intended to capture payment card information from mobile devices such as mobile device 402. Accordingly, attempted near field communication 422 may represent an attempt to retrieve payment card information from mobile device 402.

In some examples, tracking module 106 may track the contextual behavior by determining that the attempted near field communication may include an attempted complex transaction including a plurality of single-subject transactions that are marked as corresponding to plurality of distinct transaction types in a behavioral database. For example, the majority of legitimate near field communication transactions may be special-purpose transactions directed to a single subject and/or type of data. For example, a legitimate point-of-sale system may only require payment card information, a legitimate access authorization device may only require a single identity document and/or badge, a legitimate social networking application may only transfer social data (e.g., contacts, photos, etc.), etc. Accordingly, tracking module 106 may record transactions attempting to retrieve multiple types of data (e.g., payment card information, key card information, contact information, files, etc.).

In some examples, tracking module 106 may track the contextual behavior by determining that the attempted near field communication may include an attempted file transaction including a transfer of at least one file not selected for the attempted file transaction via a user interface. For example, legitimate attempts to transfer one or more files (and/or photos, contacts, and the like) may typically include a user selecting which files are to be sent. Accordingly, tracking module 106 may record transactions attempting to transmit files without evidence of user selection and/or approval.

In some examples, tracking module 106 may track the contextual behavior by determining that the attempted near field communication occurred within a predetermined temporal proximity to a plurality of additional attempted near field communications. For example, an attacker may attempt to perform a denial-of-service attack on the mobile device by performing many otherwise apparently legitimate near field communication attempts with the mobile device. Accordingly, tracking module 106 may observe whether the density of near field communication attempts exceeds a predetermined threshold (e.g., a certain number of attempts per amount of time) and/or interferes with the operation of the mobile device.

In some examples, tracking module 106 may track the contextual behavior by determining that a configuration setting of the mobile device changed within a predetermined time period following the attempted near field communication. For example, legitimate NFC tags may typically not cause a mobile device to change system configuration settings. Accordingly, tracking module 106 may record attempts by the mobile device to modify system configuration settings shortly after reading an NFC tag with the inference that the NFC tag may have included a malicious payload leveraging an exploit to modify the mobile devices configuration settings and thereby open a vulnerability in the mobile device.

In some examples, tracking module 106 may track the contextual behavior by determining that the mobile device transmitted a message within a predetermined time period following the attempted near field communication. For example, legitimate NFC tags may typically not cause a mobile device to send messages (e.g., transmitting potentially sensitive information, transmitting "premium" messages that incur a charge to the mobile device owner, transmitting information identifying the mobile device to an attacker indicating that the mobile device has been prepared with an exploit, etc.). Accordingly, tracking module 106 may record attempts by the mobile device to send messages shortly after reading an NFC tag. In some examples, tracking module 106 may record attempts by the mobile device to send short messages, apparently garbled messages (e.g., not in a known natural language), and/or messages without any observed user input after reading an NFC tag.

Returning to FIG. 3, at step 308 one or more of the systems described herein may determine, based at least in part on the contextual behavior, that the attempted near field communication poses a risk to the mobile device. For example, at step 308 determination module 108 may, as part of computing device in FIG. 2, determine, based at least in part on contextual behavior 222, that attempted near field communication 220 poses a risk to mobile device 202.

Determination module 108 may determine that contextual behavior indicates that the attempted near field communication poses a risk to the mobile device in any suitable manner. For example, determination module 108 may query a behavioral database (e.g., database 120 of FIG. 2) with the contextual behavior to determine whether the contextual behavior appears indicates a legitimate or illegitimate near field communication. In some examples, the behavioral database may receive updates as new suspicious behaviors are identified. In some examples, the behavioral database may be populated with behaviors recorded during known legitimate transactions and/or with behaviors recorded during known illegitimate transactions. Additionally or alternatively, the behavioral database may include manually-coded rules for identifying suspicious and/or illegitimate transactions based on one or more contextual behaviors.

In some examples, one or more of the systems described herein may also perform a security action in response to determining that the near field communication poses a risk to the mobile device. For example, security module 210 may, as a part of mobile device 202 in FIG. 2, perform a security action in response to determining that attempted near field communication 220 poses a security risk to mobile device 202.

Security module 210 may perform any of a variety of security actions in response to determining that the attempted near field communication poses a risk. For example, security module 210 may alert a user of the attempted near field communication, warn the user that the attempted near field communication appears suspicious, and/or present the user with an option to cancel a transaction requested and/or initiated by the attempted near field communication. In some examples, security module 210 may automatically block the attempted near field communication and/or a corresponding transaction. In some examples, security module 210 may report the attempted near field communication (e.g., to a security vendor, to an owner of the mobile device, to an administrator of the mobile device, etc.). For example, security module 210 may report the location of the attempted near field communication (e.g., using GPS data, Wi-Fi derived location data, etc.), the contextual behavior used to convict the attempted near field communication, contents of the attempted near field communication, etc. In some examples, security module 210 may ignore one or more attempted near field communications. Additionally or alternatively, security module 210 may suspend and/or disable the near field communication functionality of the mobile device.

As explained above in connection with method 300 in FIG. 3, a mobile device may receive an attempted near field communication when in proximity to a near field communication device. In order to determine whether the attempted near field communication is malicious, one or more of the systems described herein may inspect one or more contextual clues (e.g., including behaviors of the mobile device and/or one or more near field communication attempts) and establish detect behaviors and/or patterns that indicate whether the attempted near field communication is suspect. In some examples, these systems and methods may then perform a security action (e.g., to warn of, block, report, and/or ignore the attempted near field communication and/or coincidental attempted near field communications), thereby potentially preventing an exploit via near field communication (e.g., preventing data loss, mobile device disruption, etc.).

Figure 5:
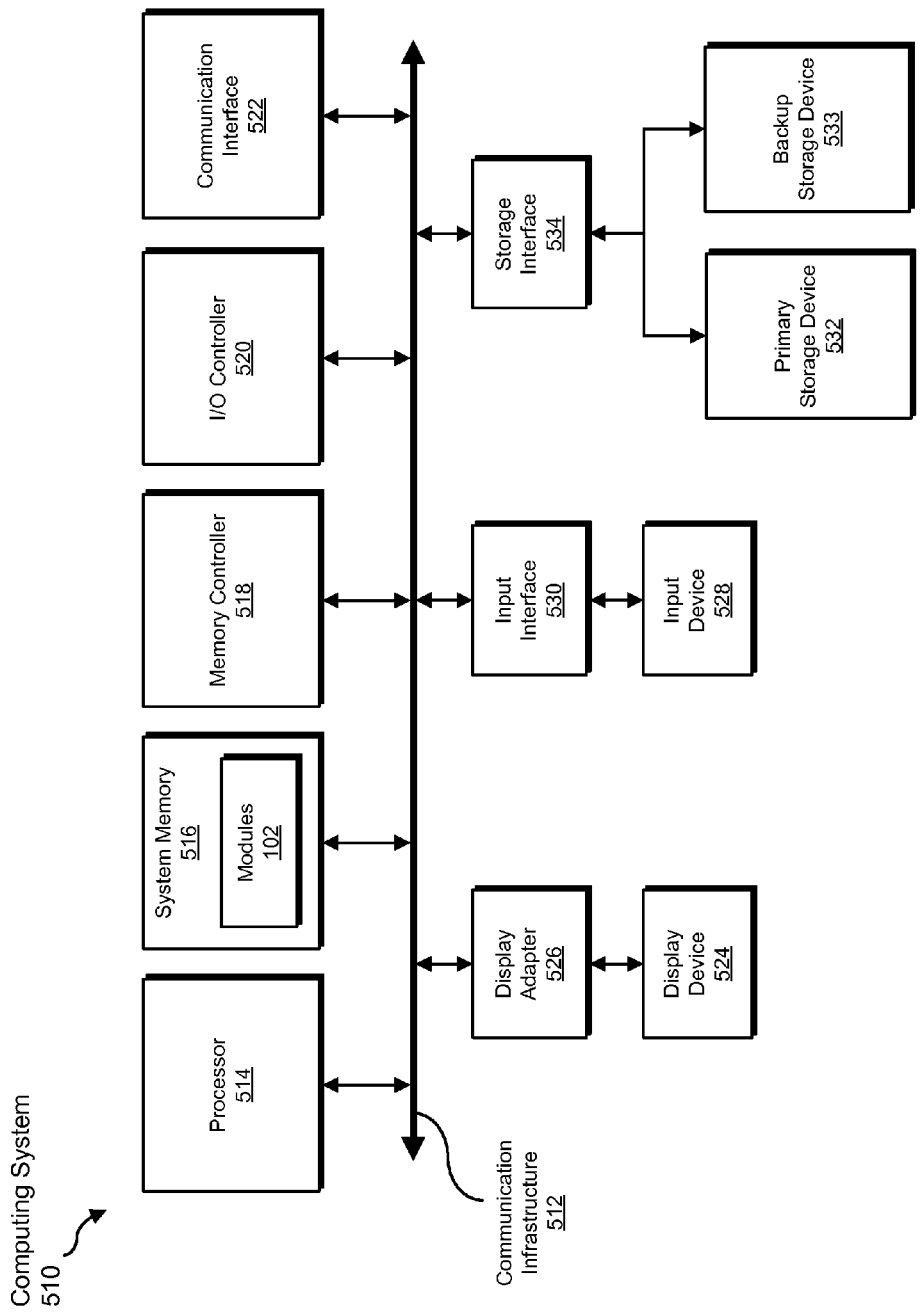
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, tracking, determining, and/or performing steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and nontransitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
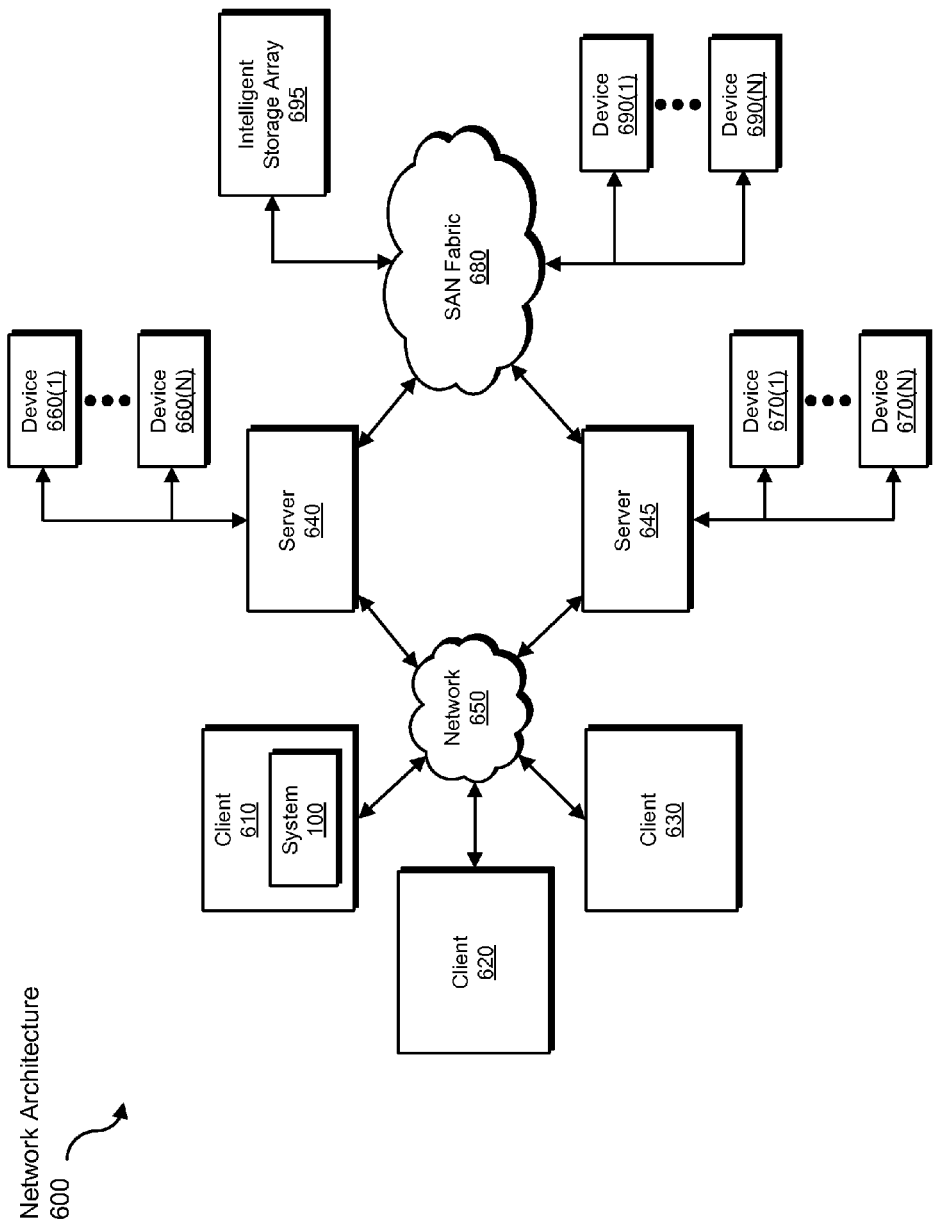
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, tracking, determining, and/or performing steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for detecting near field communication risks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a behavioral observation to be transformed, transform the behavioral observation into an assessment of a near field communication attempt, output a result of the transformation to a display to alert a user, use the result of the transformation to prevent a transaction by the attempted near field communication, and store the result of the transformation to a security database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for detecting near field communication risks, at least a portion of the method being performed by a computing device comprising at least one processor, the method comprising:
   identifying a mobile device capable of near field communication;
   identifying a potentially illegitimate attempted near field communication involving the mobile device;
   tracking at least one contextual behavior by a device with near field communication capability observed to occur during a predefined time window surrounding the potentially illegitimate attempted near field communication and relating to the potentially illegitimate attempted near field communication, wherein tracking the contextual behavior comprises determining that the mobile device did not provide a user-facing notification of the potentially illegitimate attempted near field communication;
   determining, based at least in part on the contextual behavior having occurred within the predefined time window, that the contextual behavior indicates an attempted attack on the mobile device that involves the potentially illegitimate attempted near field communication; and
   determining, based at least in part on the contextual behavior indicating an attempted attack on the mobile device, that the potentially illegitimate attempted near field communication poses a risk to the mobile device.

2. The computer-implemented method of claim 1, further comprising performing a security action in response to determining that the potentially illegitimate attempted near field communication poses a risk to the mobile device.

3. The computer-implemented method of claim 1, wherein tracking the contextual behavior comprises determining that the potentially illegitimate attempted near field communication was performed by a first near-field-communication device in proximity to the mobile device while a second near-field-communication device is also in proximity to the mobile device.

4. The computer-implemented method of claim 3, wherein tracking the contextual behavior further comprises determining that the potentially illegitimate attempted near field communication comprises an attempted sensitive transaction and that the second near-field-communication device has performed an additional attempted near field communication comprising an additional attempted sensitive transaction.

5. The computer-implemented method of claim 1, wherein tracking the contextual behavior comprises determining that the potentially illegitimate attempted near field communication comprises an attempted complex transaction comprising a plurality of single-subject transactions that are marked as corresponding to a plurality of distinct transaction types in a behavioral database.

6. The computer-implemented method of claim 1, wherein tracking the contextual behavior comprises determining that the potentially illegitimate attempted near field communication comprises an attempted file transaction comprising a transfer of at least one file not selected for the attempted file transaction via a user interface.

7. The computer-implemented method of claim 1, wherein tracking the contextual behavior comprises determining that the potentially illegitimate attempted near field communication occurred within a predetermined temporal proximity to a plurality of additional attempted near field communications.

8. The computer-implemented method of claim 1, wherein tracking the contextual behavior comprises determining that a configuration setting of the mobile device changed within a predetermined time period following the potentially illegitimate attempted near field communication.

9. The computer-implemented method of claim 1, wherein tracking the contextual behavior comprises determining that the mobile device transmitted a message within a predetermined time period following the potentially illegitimate attempted near field communication.

10. A system for detecting near field communication risks, the system comprising:
an identification module programmed to:
identify a mobile device capable of near field communication; and
identify a potentially illegitimate attempted near field communication involving the mobile device;
a tracking module programmed to track at least one contextual behavior by a device with near field communication capability observed to occur during a predefined time window surrounding the potentially illegitimate attempted near field communication and relating to the potentially illegitimate attempted near field communication, wherein tracking the contextual behavior comprises determining that the mobile device did not provide a user-facing notification of the potentially illegitimate attempted near field communication;
a determination module programmed to:
determine, based at least in part on the contextual behavior having occurred within the predefined time window, that the contextual behavior indicates an attempted attack on the mobile device that involves the potentially illegitimate attempted near field communication; and
determine, based at least in part on the contextual behavior indicating an attempted attack on the mobile device, that the potentially illegitimate attempted near field communication poses a risk to the mobile device; and
at least one processor configured to execute the identification module, the tracking module, and the determination module.

11. The system of claim 10, further comprising a security module programmed to perform a security action in response to determining that the potentially illegitimate attempted near field communication poses a risk to the mobile device.

12. The system of claim 10, wherein the tracking module is programmed to track the contextual behavior by determining that the potentially illegitimate attempted near field communication was performed by a first near-field-communication device in proximity to the mobile device while a second near-field-communication device is also in proximity to the mobile device.

13. The system of claim 12, wherein the tracking module is programmed to track the contextual behavior by determining that the potentially illegitimate attempted near field communication comprises an attempted sensitive transaction and that the second near-field-communication device has performed an additional attempted near field communication comprising an additional attempted sensitive transaction.

14. The system of claim 10, wherein the tracking module is programmed to track the contextual behavior by determining that the potentially illegitimate attempted near field communication comprises an attempted complex transaction comprising a plurality of single-subject transactions that are marked as corresponding to a plurality of distinct transaction types in a behavioral database.

15. The system of claim 10, wherein the tracking module is programmed to track the contextual behavior by determining that the potentially illegitimate attempted near field communication comprises an attempted file transaction comprising a transfer of at least one file not selected for the attempted file transaction via a user interface.

16. The system of claim 10, wherein the tracking module is programmed to track the contextual behavior by determining that the potentially illegitimate attempted near field communication occurred within a predetermined temporal proximity to a plurality of additional attempted near field communications.

17. The system of claim 10, wherein the tracking module is programmed to track the contextual behavior by determining that a configuration setting of the mobile device changed within a predetermined time period following the potentially illegitimate attempted near field communication.

18. A non-transitory computer-readable-storage medium comprising one or more computer-readable instructions that, when executed by at least one processor of a computing device, cause the computing device to: identify a mobile device capable of near field communication; identify a potentially illegitimate attempted near field communication involving the mobile device; track at least one contextual behavior by a device with near field communication capability observed to occur during a predefined time window surrounding the potentially illegitimate attempted near field communication and relating to the potentially illegitimate attempted near field communication, wherein tracking the contextual behavior comprises determining that the mobile device did not provide a user-facing notification of the potentially illegitimate attempted near field communication;
determine, based at least in part on the contextual behavior having occurred within the predefined time window, that the contextual behavior indicates an attempted attack on the mobile device that involves the potentially illegitimate attempted near field communication; and
determine, based at least in part on the contextual behavior indicating an attempted attack on the mobile device, that the potentially illegitimate attempted near field communication poses a risk to the mobile device.

19. The non-transitory computer-readable-storage medium of claim 18, wherein the one or more computer-readable instructions further cause the computing device to perform a security action in response to determining that the potentially illegitimate attempted near field communication poses a risk to the mobile device.

20. The non-transitory computer-readable-storage medium of claim 18, wherein the one or more computer-readable instructions cause the computing device to track the contextual behavior by causing the computing device to determine that the potentially illegitimate attempted near field communication was performed by a first near-field-communication device in proximity to the mobile device while a second near-field-communication device is also in proximity to the mobile device.

\* \* \* \* \*